United States Patent [19]
Williams

[11] 3,736,417
[45] May 29, 1973

[54] LIGHTING FIXTURE
[76] Inventor: Charles S. Williams, 4013-49th St., Lubbock, Tex. 79413
[22] Filed: July 27, 1970
[21] Appl. No.: 58,622

Related U.S. Application Data
[63] Continuation-in-part of Ser. No. 846,000, July 30, 1969, abandoned.

[52] U.S. Cl. .................240/78 R, 248/204, 248/317, 248/323
[51] Int. Cl. ..............................................F21s 1/00
[58] Field of Search..................248/54, 104, 126, 248/160, 204, 285, 289, 323, 324, 325, 326, 327, 333, 78 B, 78 CF, 1, 291; 240/8 BD, 8 BG, 85 R, 85 A, 85 B, 85 D, 86, 90; 272/78; 287/86

[56] References Cited
UNITED STATES PATENTS

| | | | |
|---|---|---|---|
| 576,769 | 2/1897 | Williams | 248/291 X |
| 926,426 | 6/1909 | Koch | 248/291 X |
| 2,538,655 | 1/1951 | Preston | 248/204 X |
| 2,646,950 | 7/1953 | Nelson et al | 248/1 |
| 457,687 | 8/1891 | Weimer | 248/327 |
| 504,866 | 9/1893 | Davenport | 248/160 |
| 859,398 | 7/1907 | Marsh | 240/85 A |
| 949,962 | 2/1910 | Nichols | 248/358 AA |
| 2,717,141 | 9/1955 | Livingston | 248/289 X |

FOREIGN PATENTS OR APPLICATIONS

| | | | |
|---|---|---|---|
| 214,731 | 10/1941 | Switzerland | 240/85 R |
| 432,638 | 1/1925 | Germany | 272/78 |
| 640,360 | 1/1935 | Germany | 272/78 |

Primary Examiner—William H. Schultz
Attorney—William D. Hall, Elliott I. Pollock, Fred C. Philpitt, George Vande Sande, Charles S. Steininger and Robert C. Priddy

[57] ABSTRACT

A light support portion is interconnected preferably through an adjustable joint to a lower spring means. The lower spring means is interconnected with an upper spring means by an intermediate relatively rigid means preferably a swivel joint connected at an intermediate point thereof. The upper spring means is attached to a support means. The upper spring means is shorter and more rigid than the lower spring means whereby the upper spring means mainly serves to absorb horizontal forces while the lower spring means absorbs both horizontal and vertical forces.

22 Claims, 8 Drawing Figures

Patented May 29, 1973 3,736,417

INVENTOR
CHARLES S. WILLIAMS

BY
ATTORNEYS

Patented May 29, 1973
3,736,417
2 Sheets-Sheet 2
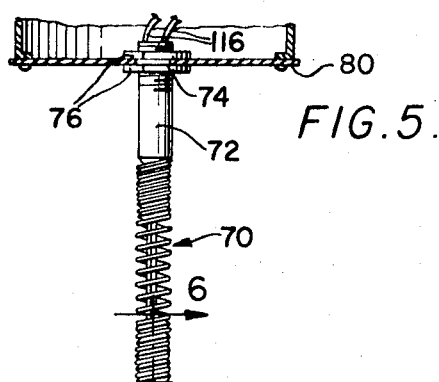
FIG.5.
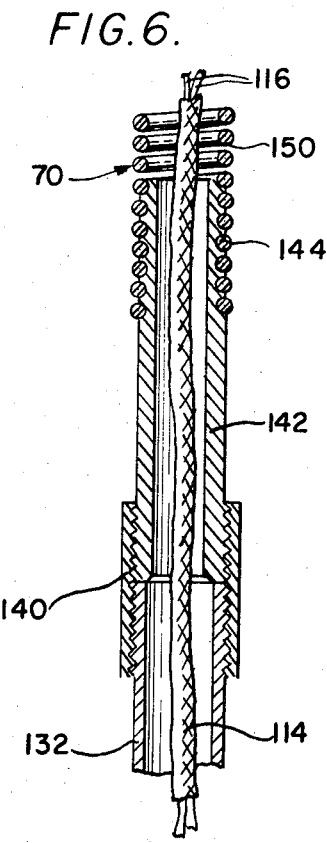
FIG.6.
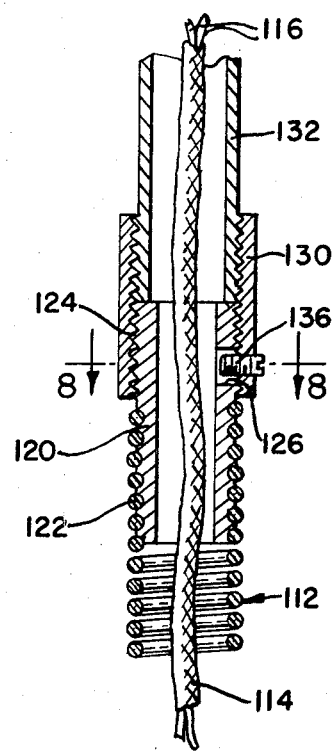
FIG.7.
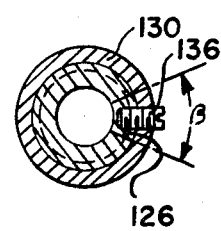
FIG.8.
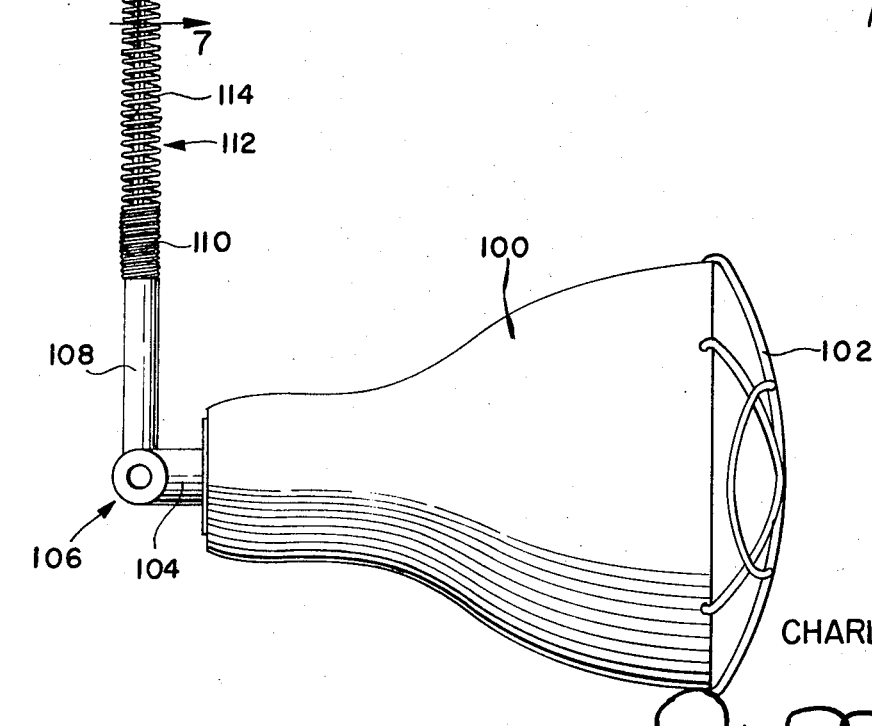
INVENTOR
CHARLES S. WILLIAMS
BY
ATTORNEY

_3,736,417_

LIGHTING FIXTURE

CROSS REFERENCE TO RELATED APPLICATION

The present application is a continuation-in-part of copending U. S. Pat. Application Ser. No. 846,000, filed July 30, 1969 now abandoned.

BACKGROUND OF THE INVENTION

The present invention relates to a lighting fixture adapted to be used in locations such as truck terminal docks, warehouses, railroad docks, storage docks, and the like wherein the lighting fixture is exposed and is liable to be accidentally struck by objects being moved about the immediate vicinity thereof.

In such applications, it is essential to provide an arrangement wherein the lighting fixture incorporates a support means which provides a shock resistant mounting to protect the lighting fixture as well as any object which may strike the lighting fixture.

The lighting fixture must be capable of absorbing both horizontal and vertical forces applied thereto, and in addition it is desirable to provide an arrangement whereby the position of the light support portion can be selectively adjusted so that the beam of light can be aimed to provide illumination at a desired location.

Various shock resistant lighting fixtures have been provided in the prior art, many such fixtures employing spring means for enabling deflection of the lighting fixture when force is applied thereto.

In conventional lighting fixtures, a single spring may be provided which is secured to a rigid conduit either fixedly secured to a junction box or connected therewith by ball swivel arrangement. When a ball swivel connection is provided, the fixture is prone to turn in a horizontal plane. The electrical wiring is accordingly twisted so as to sever it or to cause the insulation to wear off thereby resulting in a short-circuit. This occurs with ball swivel arrangements even though they are keyed and slotted.

In some instances, the rigid conduit is fixedly secured to the junction box. If such a conduit is struck or has force applied to it above the spring at the lower end thereof, the conduit is permanently bent out of alignment since there is no means for absorbing energy applied to the conduit.

If the light support portion of the fixture is attached to a rigid conduit which in turn has a single spring disposed thereabove, no protection is provided against vertical forces applied to the fixture. The light support portion is attached by means of a small rigid conduit portion through which the electrical wires extend. If vertical force is applied to the light support portion, this conduit portion will break or bend out of alignment thereby rendering the fixture unsafe in those cases wherein the insulation around the wiring is penetrated or crimped.

SUMMARY OF THE INVENTION

In the present invention, the light support portion preferably includes a selectively adjustable joint means for adjusting the angular position of the light support portion. A lower spring means is interconnected with the light support portion and is, in turn, connected to an upper spring means by an intermediate relatively rigid conduit means preferably having a swivel joint connected at an intermediate point thereof. This swivel joint enables the lower part of the fixture to be swivelly adjusted with respect to the upper part thereof so that the position of the light support portion can be adjusted through a limited arc of movement.

Means is provided for attaching the upper spring means to a support means whereby the entire lighting fixture is adapted to be supported in depending vertical relationship from a junction box or the like.

Each of the springs employed in the present invention comprises a close wound spring and the upper spring is more rigid than the lower spring. The two springs may be of the same stiffness, the upper spring being more rigid by virtue of the fact that it is of substantially less length than the lower spring. It is highly desirable to provide the upper spring with greater rigidity since such an arrangement will cause the lower part of the fixture to be returned to its original position as quickly as possible.

The upper spring serves the function of allowing the fixture to move in any lateral direction when subjected to horizontal forces thereby enabling lateral deflection of the lighting fixture. The lower spring is adapted to absorb both vertical and horizontal forces and in particular affords protection for the fixture from vertical forces applied thereto and localizes the area of give to preserve the rigidity needed for the varying length of the device. The length can be readily varied by altering the length of the relatively rigid intermediate conduit portion of the fixture.

The bottom spring is of sufficient length so that it is capable of bending double upon itself. The lower spring is capable of holding approximately three times the weight of the light support portion and yet it is adapted to flex under a force substantially less than that required to break or bend any portion of the fixture.

It is desirable to provide an arrangement for adjusting the length of the relatively rigid intermediate portion of the fixture since in different applications the light support portion must be supported at varying distances below a supporting junction box or the like.

The arrangement of the two spaced springs of different rigidity and the intermediate relatively rigid means provides significant advantages. The springs are placed at the points where the greatest amount of force is exerted and will reduce the forces most effectively at these points. The spring action is localized and any reflex action is minimized if the fixture is struck.

The swivel joint which is preferably connected at an intermediate point in the relatively rigid conduit portion of the fixture ensures a minimum wearing effect on the wiring of the fixture since there is no flexing in this area of the apparatus, thereby providing maximum protection for the internal wiring.

BRIEF DESCRIPTION OF THE DRAWINGS

FIG. 5 is a view similar to FIG. 1 illustrating a modified form of the invention;

FIG. 6 is a sectional view on an enlarged scale taken substantially along line 6—6 of FIG. 5 looking in the direction of the arrows;

FIG. 7 is a sectional view on an enlarged scale taken substantially along line 7—7 of FIG. 5 looking in the direction of the arrows; and FIG. 8 is a sectional view taken substantially along line 8—8 of FIG. 7 looking in the direction of the arrows.

DESCRIPTION OF THE PREFERRED EMBODIMENTS

Figure 1:
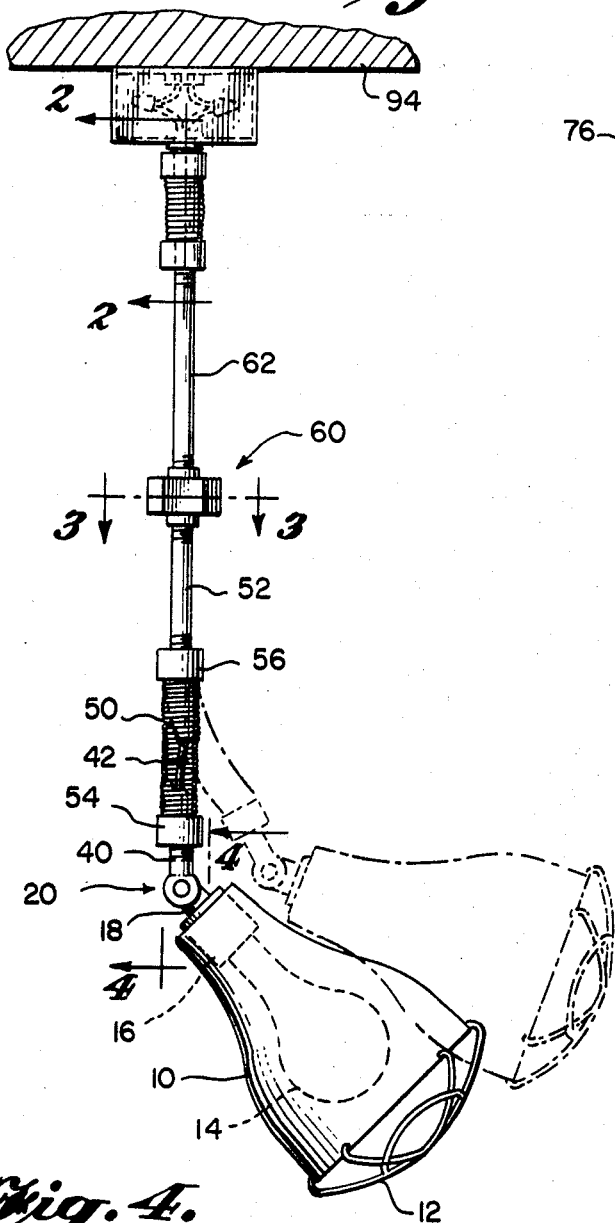
FIG. 1 is an elevation partly broken away of a lighting fixture according to the present invention.

Referring now to the drawings wherein like reference characters designate corresponding parts throughout the several views, the fixture shown in FIGS. 1–4, inclusive, includes a housing or reflector 10 which may be formed of spun aluminum or the like and which is sufficiently resilient to bend back into shape if it is deformed in any manner. A wire bulb guard 12 formed of heavy gauge wire is supported at the outer end of the housing to prevent bulb breakage.

A conventional incandescent bulb 14 is connected with the usual ceramic light socket 16 supported by the housing. A rigid portion 18 extending from the housing is interconnected with an adjustable joint means indicated generally by reference numeral 20.

Figure 4:
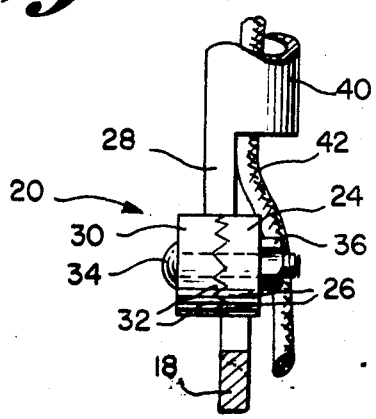
FIG. 4 is a sectional view on an enlarged scale taken substantially along line 4—4 of FIG. 1 looking in the direction of the arrows.

As seen in FIG. 4, the adjustable joint means includes a first portion 24 secured to part 18, portion 24 having a plurality of teeth 26 formed along one edge thereof. A part 28 has a portion 30 secured thereto having teeth 32 formed along one edge thereof, teeth 26 being in meshing engagement with teeth 32 in the operative position illustrated.

Portions 30 and 24 are provided with aligned holes formed therethrough which are adapted to receive a bolt 34 which may have a nut 36 threaded on the outer end thereof. It is apparent that this adjustable joint means enables the angular position of the light support portion to be adjusted with respect to the remaining part of the apparatus, whereupon the joint can be locked in adjusted position and positively held in place by the meshing teeth 26 and 32.

Part 28 includes an enlarged tubular portion 40 through which extends an electrical cable 42 operatively connected at its lower end with socket 16 to provide electrical current to the bulb within the light support portion. The upper end of tubular portion 40 is provided with threads on the outer surface thereof and this threaded upper end is, in turn, threaded into the lower end of an elongated close wound spring 50. In a typical example, spring 50 may have a length on the order of 5 inches. The cable 42 of course extends upwardly within spring 50.

A length of relatively rigid electrical conduit 52 is provided with threads on the lower end thereof and this lower end is threaded into the upper end of spring 50. In a typical example, conduit portion 52 may have a length of approximately 4 inches. Internally threaded caps 54 and 56 are threaded about the lower and upper ends respectively of spring 50.

Figure 3:
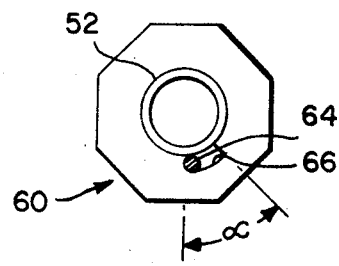
FIG. 3 is a sectional view on an enlarged scale taken substantially along line 3—3 of FIG. 1 looking in the direction of the arrows.

The upper end of conduit portion 52 is threaded and interconnected with a union type in-line swivel 60. A further conduit portion 62 is provided with threads on the lower end thereof whereby this conduit portion is also interconnected with swivel 60. As seen in FIG. 3, swivel joint 60 is of conventional construction and includes a pin 64 connected to one part of the union and is movable within a slot 66 formed in the other part of the union whereby the two parts of the union can rotate through an angle $\alpha$ of approximately 45° with respect to one another.

Figure 2:
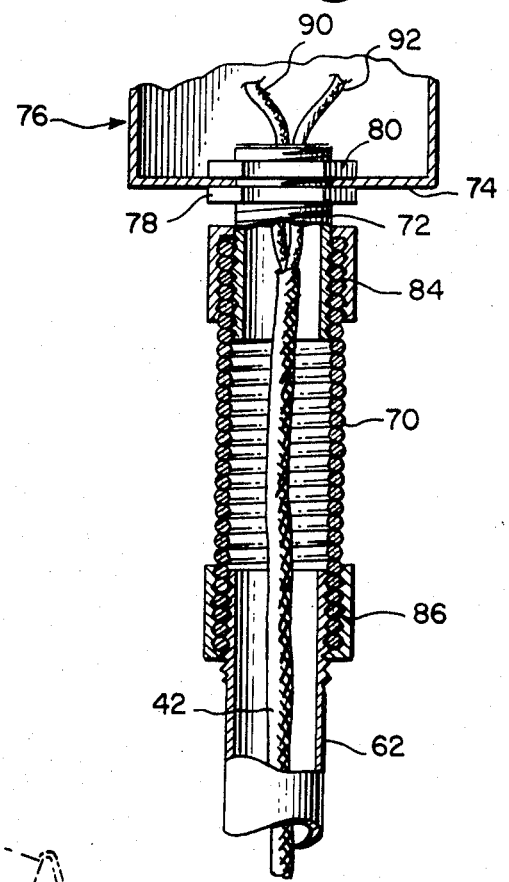
FIG. 2 is a sectional view on an enlarged scale taken substantially along line 2—2 of FIG. 1 looking in the direction of the arrows.

As seen most clearly in FIG. 2, the upper end of conduit portion 62 is provided with threads and is threaded into the lower end of a compression spring 70. A relatively rigid conduit nipple 72 which may have a length of approximately 1½ inches is threaded throughout the length thereof and is threaded into the upper end of spring 70. This nipple extends upwardly through a suitable hole provided in the base plate 74 of a conventional electrical junction box 76. A pair of nuts 78 and 80 are threaded on nipple 72 to rigidly secure it to the junction box.

Electrical cable 42 extends upwardly through the aligned rigid conduit portions and the springs as well as through the intermediate swivel joint, the cable including a pair of electrical leads 90 and 92 which may be connected with a suitable source of electrical power within the junction box in the usual manner. The junction box is adapted to be supported on any suitable supporting means 94.

An internally threaded cap 84 is threaded about the upper end of spring 70, and an internally threaded cap 86 is threaded about the lower end of spring 70.

In a typical example, spring 70 may have a length of approximately 3 inches whereby it is of substantially less length than the lower spring 52 and, accordingly, of greater rigidity.

Referring now to FIGS. 5–8, inclusive, a modified form of the invention is illustrated. A housing or reflector 100 similar to the previously described housing 10 is provided with a wire bulb guard 102 to protect the bulb supported by the housing. A conventional incandescent bulb is supported within the housing, and a rigid portion 104 extends from the housing and is interconnected with an adjustable joint means indicated generally by reference numeral 106 similar to the adjustable joint means 20 previously described.

The adjustable joint means 106 includes a tubular portion 108 the upper end of which is threaded to match the coils of a close wound spring 112 of the same construction as spring 50 previously described. As in the previously described embodiment, an electrical cable 114 is operatively connected to the socket for the incandescent bulb within the housing and extends upwardly through tubular portion 108 and spring 112.

The cable includes a pair of electrical leads 116 shown at the upper end thereof which may be connected with a suitable source of electrical power within a junction box in the usual manner.

A rigid member or nipple 120 is provided with threads 122 on the lower end thereof which match the spring coils of spring 112. The upper end of nipple 120 is provided with standard threads 124 on the outer surface thereof. A slot 126 is formed through the wall of the tubular nipple, and as seen in FIG. 8, this slot extends through an angle $\beta$ of approximately 45°.

A rigid tubular coupling member 130 is of generally cylindrical configuration and has an internal thread formed thereon which is adapted to be threaded on the external thread on the upper end of nipple 120. Coupling member 130 is additionally adapted to be threaded onto the threaded lower end of a rigid tubular member or electrical conduit 132. A set screw 136 is threaded through a radially extending hole provided in the wall of coupling member 130, the inner end of the set screw being positioned within slot 126 previously described. It is apparent that this pin and slot arrangement will enable rotation of the lower portion of the fixture through an angle of approximately 45° with respect to the upper portion thereof since nipple 120 may rotate through such an angle with respect to the coupling member 130.

The upper end of member 132 is in turn provided with a standard thread which is threaded within a tubular coupling member 140 of generally cylindrical configuration and provided with a threaded longitudinal bore extending therethrough. The lower end of a nipple 142 is provided with standard threads threaded into coupling member 140, while the upper end 144 of the nipple is threaded to match the spring coils on a further compression spring 150 which may be of the same construction as spring 70 previously described. A further nipple or rigid member 72 has the lower end thereof threaded to match the spring coils of spring 70, the upper end of nipple 72 being provided with standard threads 74 which receive a pair of nuts 76 to rigidly secure the nipple to a junction box 80.

The electrical cable extends upwardly through the various tubular aligned portions of the fixture, and the junction box is adapted to be supported on any suitable supporting means.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A lighting fixture comprising a light support portion which includes a light socket, a lower spring means, said light support portion being interconnected with said lower spring means and being substantially adjacent to said lower spring means, an upper spring means, means for attaching said upper spring means to a support means, an intermediate relatively rigid means connected between said lower spring means and said upper spring means, wherein said intermediate relatively rigid means includes a passage for an electrical cable, and an electrical cable passing through said support portion, lower spring means, upper spring means, intermediate relatively rigid means, and operatively connected to said socket.

2. The lighting fixture of claim 1 wherein said upper spring means is more rigid than lower spring means.

3. The lighting fixture of claim 1 wherein said upper spring means is of less length than said lower spring means.

4. The lighting fixture of claim 1 wherein each of said spring means comprises a close wound spring.

5. The lighting fixture of claim 1 which includes an adjustable joint means in the interconnection between said light support portion and said lower spring means for adjusting the angular position of said light support portion with respect to said lower spring means.

6. The lighting fixture of claim 5 wherein said adjustable joint means comprises intermeshing teeth, and means for positively locking the joint in a particular adjusted position.

7. The lighting fixture of claim 1 wherein said intermediate relatively rigid means includes a pair of rigid members operatively engaged with the opposite ends of each of said springs, each of said rigid members having an end threaded to match the spring coils of said springs.

8. The lighting fixture of claim 7 which includes a coupling member which is connected to the end of at least one of said rigid members which is opposite the end threaded to match the spring coils.

9. The lighting fixture of claim 8 including a further rigid member connected to said coupling member.

10. The lighting fixture of claim 7 including a swivel joint connected in said intermediate relatively rigid means and comprising a pin connected to a first rigid member and a slot formed in a second rigid member for receiving said pin.

11. The lighting fixture of claim 10 wherein said first rigid member comprises a coupling member connected to the end of said second rigid member which is opposite the end threaded to match the spring coils.

12. The lighting fixture of claim 11 including a further rigid member connected to said coupling member.

13. The lighting fixture of claim 1 which includes a swivel joint connected to an intermediate portion of said relatively rigid means.

14. The lighting fixture of claim 1 wherein said bottom spring is of sufficient length so that it is capable of bending double upon itself.

15. The lighting fixture of claim 14 wherein said bottom spring is capable of holding approximately three times the weight of the light support portion and is adapted to flex under a force substantially less than that required to break or bend any portion of the fixture.

16. The lighting fixture of claim 1 wherein said intermediate relatively rigid means includes a pair of rigid members, each of which is threadedly engaged with one of the said spring means.

17. A lighting fixture comprising a light support portion which includes a light socket, a lower spring means, said light support portion being interconnected with said lower spring means, an upper spring means, means for attaching said upper spring means to a support means, an intermediate relatively rigid means connected between said lower spring means and said upper spring means, wherein said intermediate relatively rigid means includes a passage for an electrical cable, an electrical cable passing through said support portion, lower spring means, upper spring means, intermediate relatively rigid means, and operatively connected to said socket; wherein said upper spring means is more rigid than said lower spring means.

18. The lighting fixture of claim 17 wherein each of said spring means comprises a close wound spring.

19. A lighting fixture comprising a light support portion which includes a light socket, a lower spring means, said light support portion being interconnected with said lower spring means, an upper spring means, means for attaching said upper spring means to a support means, an intermediate relatively rigid means connected between said lower spring means and said upper spring means, wherein said intermediate relatively rigid means includes a passage for an electrical cable, and an electrical cable passing through said support portion, lower spring means, upper spring means, intermediately relatively rigid means, and operatively connected to said socket; wherein said upper spring means is of less length than said lower spring means.

20. A lighting fixture comprising a light support portion which includes a light socket, a lower spring means, said light support portion being interconnected with said lower spring means, an upper spring means, means for attaching said upper spring means to a support means, an intermediate relatively rigid means connected between said lower spring means and said upper spring means, wherein said intermediate relatively rigid means includes a passage for an electrical cable, a swivel joint connected to an intermediate portion of said relatively rigid means, and an electrical cable passing through said support portion, lower spring means, upper spring means, intermediate relatively rigid means, and operatively connected to said socket.

21. Apparatus of claim 20 wherein said swivel joint is connected in line with said relatively rigid means and said spring means in the normal depending position thereof whereby one part of said relatively rigid means is adapted to swivel with respect to another part thereof about the longitudinal axis of said relatively rigid means.

22. The apparatus of claim 20 wherein said swivel joint permits swiveling of one part of said relatively rigid means through a limited arc of approximately 45° with respect to another part thereof.

* * * * *